June 19, 1923.

C. H. DOCKSON

HIGH PRESSURE REGULATOR

Filed April 2, 1920

1,459,501

Inventor
CHARLES HOWELL DOCKSON.

By Ralzemond A. Parker
Attorney

Patented June 19, 1923.

1,459,501

UNITED STATES PATENT OFFICE.

CHARLES HOWELL DOCKSON, OF DETROIT, MICHIGAN.

HIGH-PRESSURE REGULATOR.

Application filed April 2, 1920. Serial No. 370,726.

*To all whom it may concern:*

Be it known that I, CHARLES HOWELL DOCKSON, citizen of the United States, residing at Detroit, county of Wayne, State of Michigan, have invented a certain new and useful Improvement in High-Pressure Regulators, and declare the following to be a full, clear, and exact description of the same, such as will enable others skilled in the art to which it pertains to make and use the same, reference being had to the accompanying drawings, which form a part of this specification.

My invention relates to high pressure regulators for use in connection with any apparatus where it is desired to reduce a gas pressure in order to use the gas. It is particularly exemplified in an oxy-acetylene cutting or welding outfit, but is adapted to regulate gas or air under pressure in any apparatus such as that used in soda fountains or in the inflation of pneumatic tires or in the cutting or welding mechanism above referred to.

These regulators are adapted for attachment to the outlet of the gas or air reservoir and are virtually regulator valves which reduce the reserve tank pressure to the desired working pressure so that gas may be used for the purpose desired.

My invention consists in the improvement set forth and described in the accompanying drawing and specification in which, for the sake of convenience, my invention is described as applied to an oxy-acetylene apparatus.

In the drawings,—

The purpose of my invention is to provide a regulator so constructed that it may be easily disassembled to remove the valve seat carrying diaphragm. It has been found in practice that these regulators are accustomed to get out of order more or less easily; the diaphragm will buckle or dirt will clog up the passageway causing a leakage, or other defects will necessitate the removal of the diaphragm to repair the regulators.

In the regulators as now constructed, the diaphragm is soldered in place and to remove the same it must be cut out, its receiving groove must be likewise cleaned out and the new diaphragm soldered in position. This is an operation which the owner or user is generally unable to perform and it is necessary to return the regulators to the manufacturer. The result is delay, idle machinery, loss of time and added expense. These and other objections my improvement is designed to overcome.

Let $a$ represent the oxygen tank; $b$ the outlet therefrom; $c$ the regulator assembly; $d$ the pressure gauge for the regulator outlet and $e$ the gauge for the work, the outlet of which is indicated as $g^2$.

Figure 1:
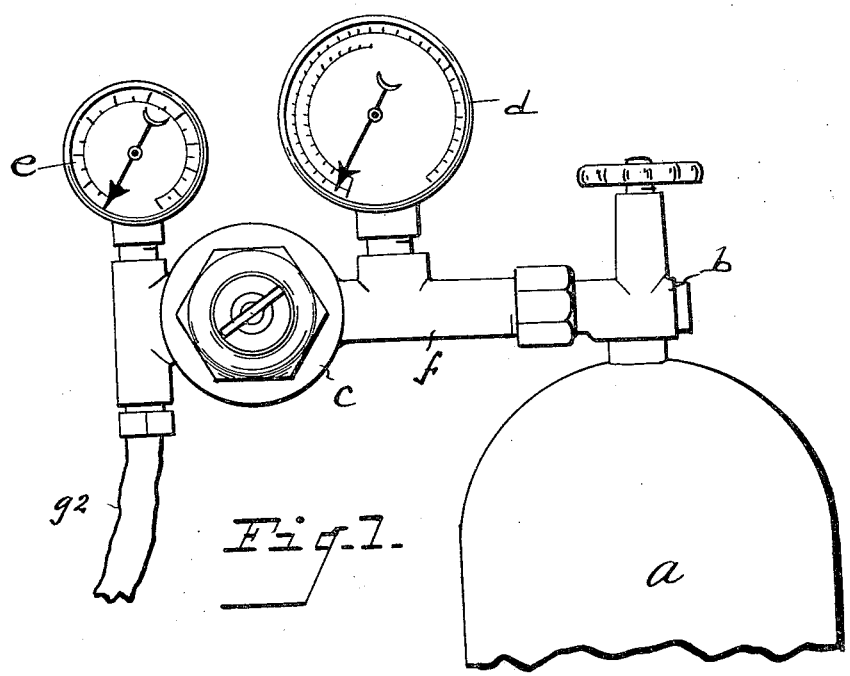
Figure 1 is an elevation showing my regulator in position as attached to a tank.
Figure 2:
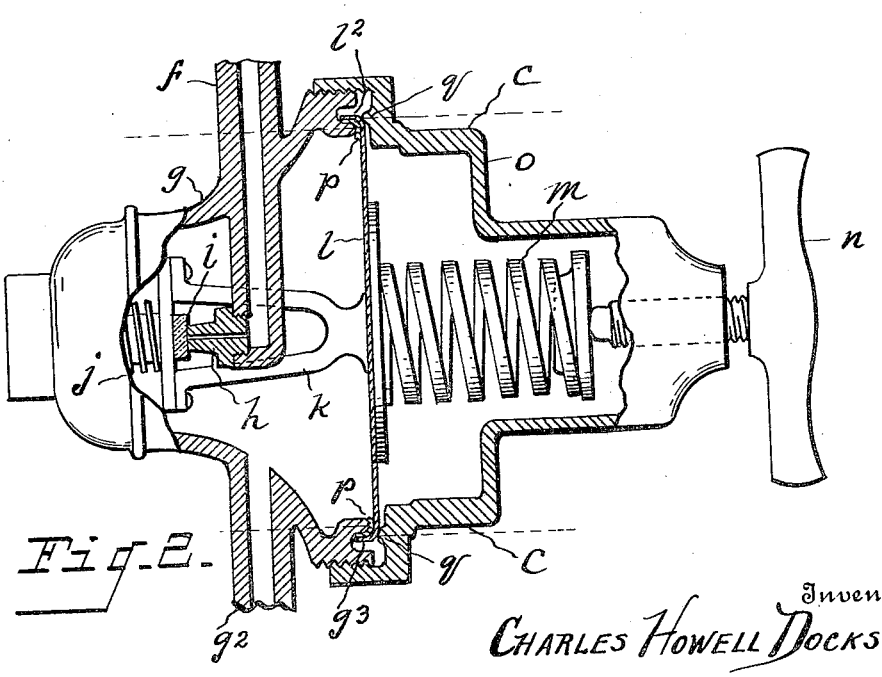
Fig. 2 is a vertical section thru the regulator.

$f$ is the pipe leading from the tank outlet to the regulator valve proper, shown in Fig. 2 as being formed integral with the regulator chamber $g$ and provided with a valve nozzle $h$ and a valve seat $i$. This valve nozzle is stationary, the seat being adapted to be receded and advanced. The seat is normally situated to close the outlet from the nozzle $h$. The spring $j$ is adapted to assist in keeping the seat in such position. A yoke $k$ is carried by the seat and the opposite end of the yoke is fastened to the diaphragm $l$. This diaphragm $l$ is adapted for diaphragmatic action by means of a spring $m$ disposed over the projecting end of a hand screw $n$ adapted to be compressed by turning said hand screw, forcing the diaphragm inwardly as will be seen from the drawing. This spring is contained within a cap section $o$ which is adapted to screw on the regulator chamber $g$, the two sections forming male and female sections of the regulator casing.

The construction thus far described is of the conventional type found in all high pressure regulators. The gas or air under tank pressure enters thru the conduit $f$ and escapes thru the nozzle $h$ to the chamber $g$ from which it is allowed to pass out through thru the conduit $g^2$ to the torch. As the pressure in the tank will be anywhere from 0 to 2400 pounds per square inch and at the torch from 1 to 500 pounds per square inch, the pressure must be greatly reduced and this is accomplished by regulating the space between the valve nozzle $h$ and its seat $i$ thru operation of the hand screw $n$.

If it is desired to maintain, for instance, a pressure of thirty pounds, the hand screw is set as desired to limit the aperture between the nozzle and the valve seat. When the pressure rises in the chamber $g$ to a certain height the gas pressure will force the diaphragm back against the resistance of a spring $m$, closing the valve seat $i$ against the nozzle, thus cutting off the supply of gas until this pressure in the chamber is reduced permitting the diaphragm to move the valve seat away from the nozzle. This is the operation of the regulator and is common to all such devices.

In the regulators now in use, however, this diaphragm is soldered in position. In my desire to overcome the disadvantages hereinbefore referred to, and to provide a regulator capable of being repaired by any workman, I have provided a valve seat carrying diaphragm which is removable.

The diaphragm $l$ is provided with a peripheral flange $l^2$ which overlaps the edge of the regulator chamber, and is adapted to be received within a groove $g^3$. A flat washer $p$ of fibre or other suitable material is inserted between this diaphragm and the edge of the chamber, as shown. The washer $p$ is here shown as being of greater width than the edge of the chamber which it abuts and adapted to slightly overlap into the groove $g^3$. The cap $o$ is then fastened securely in place, being adapted so that with the aid of a wrench it can be screwed down so as to form a gas-tight joint between the diaphragm and the edge of the gas chamber $g$. To assist in forming this gas-tight joint the cap is provided with a bead $q$ adapted to impinge the diaphragm positioned opposite the groove $g^2$ but offset therefrom so as to force the diaphragm against the edge of the gas chamber, as shown in the drawing.

What I claim is:

In a pressure regulator, a hollow casing comprising male and female sections adjustably secured together, such sections having opposed circumferential bearing surfaces, a removable flexible diaphragm adapted to be gripped between said surfaces to divide the interior of the casing into two compartments, an annular gasket interposed between said diaphragm and one of said bearing surfaces, the bearing surface of one section provided with an annular groove having a rounded lip, the bearing suface of the other section provided with a rounded annular bead slightly offset exteriorly of the groove of the other section to engage the diaphragm and draw the same over the rounded lip of the other section into the groove thereof.

In testimony whereof, I sign this specification.

CHARLES HOWELL DOCKSON.